United States Patent [19]
Ichihara et al.

[11] Patent Number: 5,997,978
[45] Date of Patent: Dec. 7, 1999

[54] PHASE CHANGE OPTICAL RECORDING MEDIUM AND OPTICAL RECORDING METHOD

[75] Inventors: Katsutaro Ichihara, Yokohama; Keiichiro Yusu, Kawasaki, both of Japan

[73] Assignee: Kabushiki Kaisha Toshiba, Kawasaki, Japan

[21] Appl. No.: 08/900,454

[22] Filed: Jul. 25, 1997

[30]     Foreign Application Priority Data

Jul. 26, 1996  [JP]  Japan ................................. 8-197584

[51] Int. Cl.⁶ ....................................... B32B 3/02
[52] U.S. Cl. ...................... 428/64.4; 428/64.1; 428/64.2; 428/689
[58] Field of Search .............. 430/270.1, 271.1, 430/272.1, 523; 428/64.1, 64.4, 64.2, 689; 365/124

[56]              References Cited

U.S. PATENT DOCUMENTS 5,635,267  6/1997  Yamada et al. .................... 428/64.4
5,864,357  1/1999  Akutsu .................................. 347/262

OTHER PUBLICATIONS

Kasami Y et al: "Premastered Optical Disk by Superresolution Using Rear Aperture Detection", Jpn J. Appl. Phys. vol. 35 (1996) pp. 423–428.

*Primary Examiner*—William Krynski
*Assistant Examiner*—Hong J. Xu
*Attorney, Agent, or Firm*—Pillsbury, Madison & Sutro, LLP

[57]              ABSTRACT

A phase change optical recording medium includes a phase change optical recording layer which transits between two states of the crystalline state and the amorphous state when irradiated with light, and a heat adjustment layer which is formed adjacent to the phase change optical recording layer and abruptly increases or decreases thermal conductivity with increasing temperature upon irradiation of recording light. This phase change optical recording medium can decrease the size of the recording mark and makes high-density recording possible.

19 Claims, 4 Drawing Sheets

PHASE CHANGE OPTICAL RECORDING MEDIUM AND OPTICAL RECORDING METHOD

BACKGROUND OF THE INVENTION

1. Field of the Invention

The present invention relates to a phase change optical recording medium for recording and reproducing information by irradiating a laser beam and an optical recording method using this phase change optical recording medium.

2. Description of the Related Art

An optical disk by which information is recorded and reproduced by irradiating a laser beam has a large capacity and a high access speed equivalent to those of a rigid magnetic disk. In addition, the optical disk has medium portability equivalent to that of a floppy disk or a tape medium. Accordingly, the optical disk achieves an excellent performance in storing various information such as images, sounds, and computer data. A phase change optical disk among such optical disks has the following advantages. That is, the phase change optical disk is readily compatible with a read-only optical disk represented by CD-ROM. Also, the phase change optical disk can be easily overwritten by light intensity modulation, and this increases the data transfer rate. Furthermore, in the phase change optical disk, land-groove (L-G) recording proposed as a high-density technology can be realized with a single optical beam. For these reasons, the phase change optical disk is expected to find widespread use in the future as the recording density is improved.

To improve the recording density of the phase change optical disk, it is necessary to decrease the recording mark pitch or the recording mark size. Three methods of decreasing the recording mark pitch are pulse width modulation recording/mark-edge detection, superresolution readout and L-G recording described above. In the land-groove recording method, the depth of a groove is set to about ⅙ of the laser wavelength to reduce crosstalk record data in lands and grooves. A density about twice that of a conventional method in which data is recorded only in lands or grooves can be expected. The pulse width modulation recording method records information in the edge portion of a recording mark, and a density about 1.5 times that of the conventional mark position recording can be expected. The superresolution readout is proposed primarily for ROM media. This method improves the readout resolution by forming a masking layer, whose light transmittance changes in accordance with the intensity of a readout laser beam, on the light source side of a recording pit surface (e.g., Proc. ISOM '95, We-Cl, Fr-Dl). When these high-density recording technologies are used, a current recording density of approximately $10^6$ bit/mm$^2$ is expected increase to 10 to 20 times. However, to further improve the recording density, a new method must be established.

The use of a short-wavelength laser is being studied to decrease the recording mark site. A method of decreasing the recording mark size can be accomplished by forming a recording mark only in the vicinity of the end portion of the laser beam spot and decreasing the recording laser power. Unfortunately, this method results in significantly narrowing the recording power margin as will be described below.

As is well known, in the phase change optical disk, the intensity of the readout signal from a recording mark during readout shows a steep rise and saturation (so-called Γ characteristic) with respect to the recording power during recording. Assume that the actual temperature of a phase change optical recording layer is T and the melting point of a recording layer material is $T_m$. Since $T<T_m$ in the entire laser irradiated portion until the recording power reaches the threshold power ($P_{th}$), no recording marks are formed. When the power reaches $P_{th}$, fine marks begin to formed in a region where $T=T_m$. When the power exceeds $P_{th}$, the region where $T \geq T_m$ expands to enlarge the recording marks, and the intensity of the readout signal from the recording marks sharply rises accordingly. However, when the region where $T \geq T_m$ expands to make the recording marks equivalent to the full-width at half maximum (FWHM) of the laser beam spot, the readout signal intensity is saturated without increasing very much even if the recording power is further increased. The reason for this is as follows. Because the intensity profile of a laser beam shows a nearly Gaussian distribution, recording marks are not easily formed in a region exceeding the full-width at half maximum of the recording spot. Additionally, even when excessively large recording marks are formed, these recording marks do not contribute to the readout signal intensity because the intensity distribution of the readout spot is also a Gaussian distribution.

To record data stably in a phase change optical disk, it is desirable for the margin of the recording power be wide. Therefore, a value corresponding to the saturation region of the Γ characteristic is chosen as the recording power. Also, the Γ characteristic is preferably as steep as possible because a wide margin of the recording power can be set even at a relatively low laser power. However, as described previously, simply decreasing the recording power for the purpose of decreasing the recording mark size is equivalent to selecting a value corresponding to the rise region of the Γ characteristic as the recording power. This is impractical because the margin of the recording power is significantly narrowed, and so the readout signal intensity largely varies with a slight power fluctuation.

SUMMARY OF THE INVENTION

It is an object of the present invention to provide a phase change optical recording medium capable of high-density recording by decreasing the recording mark size while maintaining enough operating power margin, and an optical recording method using this phase change optical recording medium.

A phase change optical recording medium of the present invention comprises a phase change optical recording layer and a heat adjustment layer. The phase change optical recording layer transits between two states, a crystalline state and an amorphous state when irradiated with light. The heat adjustment layer which is formed adjacent to the phase change optical recording layer and is made from a material whose thermal conductivity changes when irradiated with light.

The heat adjustment layer is made from a material whose thermal conductivity increases or decreases with increasing light intensity.

According to one aspect of the present invention an optical recording method for a phase change optical recording medium includes a phase change optical recording layer which transits between two states a crystalline state and an amorphous state, when irradiated with light, and a heat adjustment layer formed adjacent to the phase change optical recording layer and made from a material whose thermal conductivity increases when irradiated with light. When a light beam at a recording power level is irradiated and the light irradiated portion of the phase change optical recording layer is melted, the thermal conductivity of the heat adjustment layer is set high in a region corresponding to a central portion of the molten portion and low in a region corresponding to a portion other than the central portion of the molten portion. In a cooling process a cooling rate is set to be higher than a crystallization rate in the central portion of the molten portion and a cooling rate is set to be lower than the crystallization rate in the portion other than the central portion of the molten portion. Therefore, a recording mark is formed in the central portion of the molten portion.

According to another aspect of the present invention, an optical recording method for a phase change optical recording medium includes a phase change optical recording layer which transits between two states of a crystalline state and an amorphous state, when irradiated with light, and a heat adjustment layer which is formed adjacent to the phase change optical recording layer and is made from a material whose thermal conductivity decreases when irradiated with light. When a light beam at a recording power level is irradiated, the thermal conductivity of the heat adjustment layer is set low in a region corresponding to the light irradiated portion and high in a region corresponding to a portion other than the light irradiated portion. Thus a central portion of the light irradiated portion is heated to the melting point or more of the phase change optical recording material and the portion other than the central portion of the light irradiated portion is held below the melting point of the phase change optical recording material. A recording mark is formed in the central portion of the light irradiated portion.

Additional objects and advantages of the invention will be set forth in the following description, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in more detail below.

The principle of the operation of a phase change optical recording medium is as follows. In recording, a light beam at a recording power level is irradiated on a phase change optical recording layer in a crystalline state to heat the light irradiated portion (a region equivalent to the full-width at half maximum of intensity profile of the light beam spot) to the melting point ($T_m$) or more, thereby melting the phase change material. The phase change material is then cooled within a time shorter than the crystallization time to form amorphous recording marks. In reproduction, a light beam at a reproduction power level is irradiated to reproduce the signal on the basis of the difference in reflectance between the crystalline region and the amorphous region. In erasure, a light beam at an erasure power level is irradiated on amorphous recording marks to heat the light irradiated portion to the crystallization temperature ($T_x$) to less than $T_m$. The amorphous recording marks are held in this state for a time longer than the crystallization time. Consequently, the amorphous recording marks crystallize and are erased.

Assume that the crystallization time of the phase change material is $\tau_x$, the time required for the temperature of the molten recording layer to lower from $T_m$ to $T_x$ during the course of cooling in recording is $\tau_w$, the time during which the recording layer is held at a temperature of $T_x$ to lower than $T_m$ in erasure is $\tau_e$, and the temperature of the recording layer in the region to be recorded or erased is T. If this is the case, the recording conditions are described as $T \geq T_m$ and $\tau_w < \tau_x$, and the erasure conditions are described as $T_m > T \geq T_x$ and $\tau_x \leq \tau_e$.

In the present invention, a heat adjustment layer is formed adjacent to the phase change optical recording layer to reduce the region meeting the above recording conditions during recording compared to that in conventional media. Consequently, it is possible to form small recording marks and realize superresolution recording.

A phase change optical recording material usable in the present invention is not particularly limited. Examples are phase change materials capable of being repeatedly overwritten such as GeTeSn, GeSbTe, SnSeTe, InSeTlCo, InSeTe, AgInSbTe, and InSbTe. $TeO_x$ and SbSe/BiTe as write once phase change materials can also be used. The melting points $T_m$ of these phase change materials are 400 to 800° C., and their crystallization times $\tau_x$ are a few tens of nanoseconds to a few microseconds.

Figure 1:
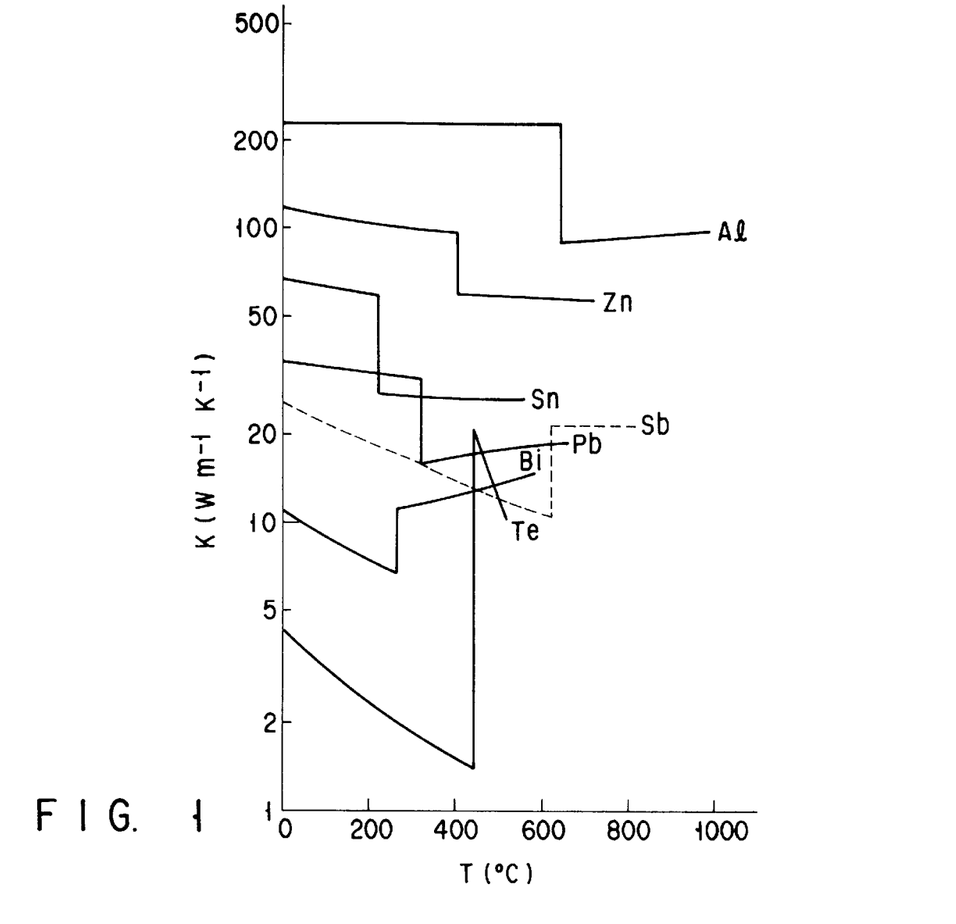
FIG. 1 is a graph showing the temperature dependencies of the thermal conductivities (κ) of low-melting metal elements used in a heat adjustment layer according to the present invention.

In the present invention, the material forming the heat adjustment layer preferably has thermal conductivity which shows a large discontinuous (nonlinear) change with respect to the light intensity, i.e., the temperature. In particular, a material having a transition point, e.g., a crystal structure transition point or a melting point, within a temperature range from room temperature to about $2T_m$ is preferable. Low-melting metals are examples of such a material. FIG. 1 shows the temperature dependencies of the thermal conductivities (κ) of low-melting metals usable in the heat adjustment layer according to the present invention. In any of these metal elements, the thermal conductivity κ changes discontinuously and largely around the transition point (in this case, the melting point).

As shown in FIG. 1, Bi, Sb, Te, and their alloys are examples of a material whose thermal conductivity steeply increases when melted, and Zn, Al, Pb, Sn, and their alloys are examples of a material whose thermal conductivity sharply decreases when melted. Note that it is also possible to use, where necessary, an alloy of two different kinds of metals which change their thermal conductivities differently. TeZn is an example of such an alloy whose thermal conductivity sharply increases when melted. Also, an alloy of any of the above metals and some other metal can be used to adjust the thermal conductivity. SnY is an example of such an alloy whose thermal conductivity steeply decreases when melted. The transition point of the heat adjustment layer can be properly controlled by forming alloys of metal elements with relatively low melting points as described above at an appropriate ratio. In the present invention, it is only necessary to adjust the transition point ($T_s$) of the heat adjustment layer by taking account of $T_m$, $T_x$, and $\tau_x$ of the phase change optical recording layer and $\tau_w$ and $\tau_e$ which are determined in accordance with the structure of stacked layers or the operating conditions.

In the present invention, the heat adjustment layer is formed adjacent to the phase change optical recording layer. The heat adjustment layer can be stacked directly on the recording layer, or a thin film which has a minor effect on thermal conductivity can be inserted between the heat adjustment layer and the recording layer. For example, when the heat adjustment layer is formed by using a low-melting metal as described above, it is preferable to form a barrier layer for preventing mutual diffusion.

A superresolution recording method which can be applied preferably to the phase change optical recording medium of the present invention has the heat adjustment layer made from a material whose thermal conductivity increases as the temperature rises (i.e., as the light intensity increases) will be described below. The principle of this first optical recording method is that although a region meeting $T \geq T_m$ in the recording layer is equivalent to the full-width at half maximum of the laser beam spot, a region where $\tau_w \geq \tau_x$ is reduced to form fine recording marks.

Figure 2:
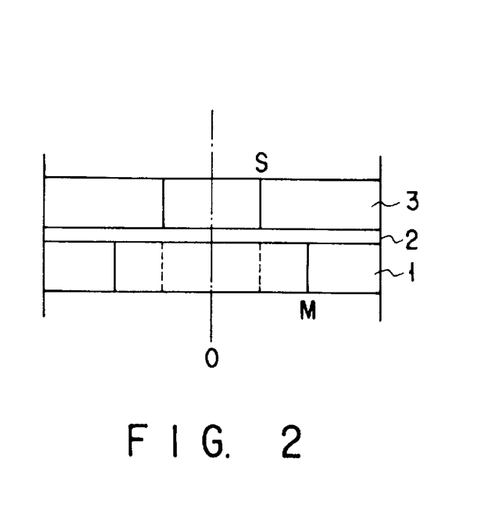
FIG. 2 is a view showing the principal layers of a phase change optical recording medium according to the present invention.

FIG. 2 shows only the principal layers of a phase change optical recording medium having a heat adjustment layer whose thermal conductivity increases with increasing light intensity. As shown in FIG. 2, a barrier layer 2 and a heat adjustment layer 3 whose thermal conductivity increases in accordance with the light intensity are stacked on a phase change optical recording layer 1. Symbols used in FIG. 2 have the following meanings. O indicates the center of a laser beam spot. S indicates a position at which the temperature of the heat adjustment layer has reached the transition point $T_s$ (in this case the melting point). Thermal conductivity is high in a region inside S. M indicates a position at which the temperature of the recording layer has reached the melting point $T_m$. The region inside M is melted.

Figure 3:
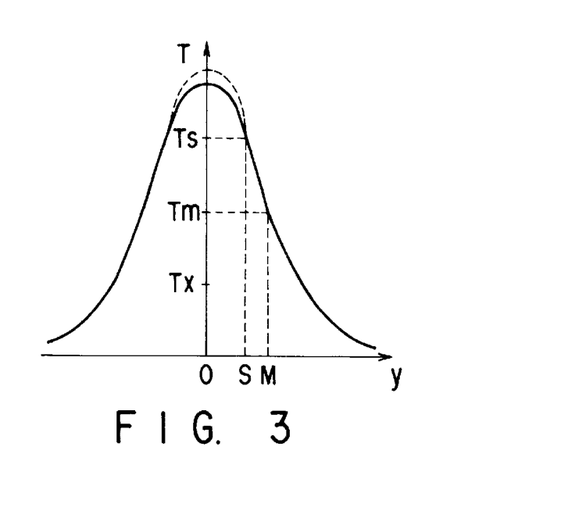
FIG. 3 is a graph showing the temperature distribution of the optical recording layer of the phase change optical recording medium in FIG. 2.

FIG. 3 shows the temperature distribution of the recording layer 1 in FIG. 2. In FIG. 3, the ordinate indicates a temperature T, and the abscissa indicates a distance y when the center O of the light spot is the origin. As shown in FIG. 3, the transition point $T_s$ at which the thermal conductivity of the heat adjustment layer 3 largely increases is set to be higher than the melting point $T_m$ of the recording layer 1. The broken curve in FIG. 3 shows the temperature distribution of the recording layer 1 when it is assumed that the thermal conductivity of the heat adjustment layer 3 does not change. The solid curve in FIG. 3 shows the temperature distribution of the recording layer 1 which is affected by changes in the thermal conductivity of the heat adjustment layer 3. When the temperature of the heat adjustment layer 3 exceeds $T_s$ in a central portion of the light spot, its thermal conductivity increases to improve the heat radiation properties, and this suppresses any temperature rise in the recording layer 1. Referring to FIG. 3, the solid curve is positioned below the broken curve in a region corresponding to the central portion of the light spot. This shows that temperature rises in the recording layer 1 are suppressed.

Figure 4A:
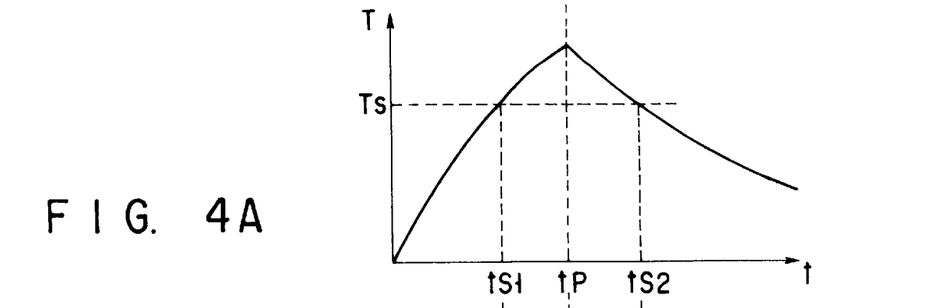
FIG. 4A is a graph showing the thermal response characteristics of the heat adjustment layer in FIG. 2.
Figure 4B:
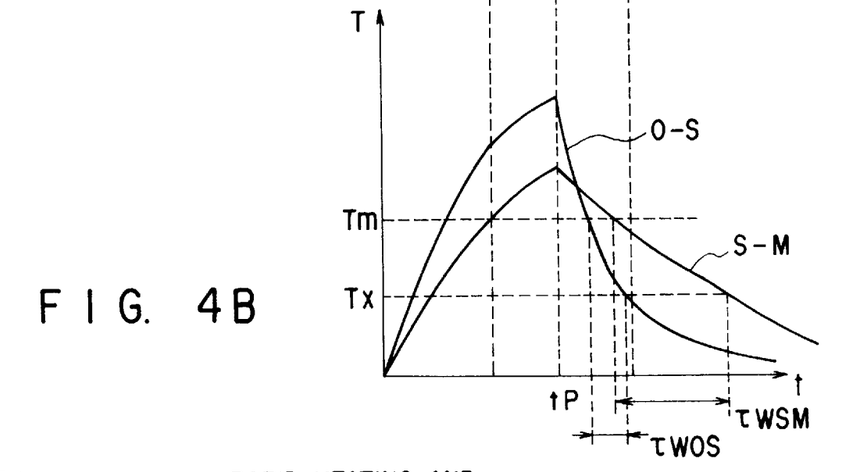
FIG. 4B is a graph showing the thermal response characteristics of the recording layer in FIG. 2.
Figures 5, 6:
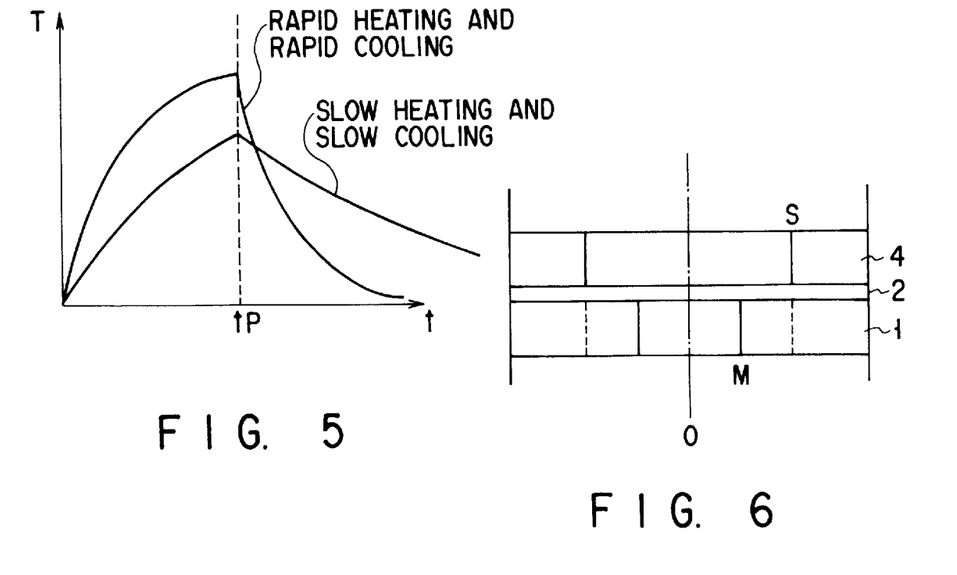
FIG. 5 is a graph showing the thermal response characteristics of a recording layer having no heat adjustment layer.
FIG. 6 is a view showing the principal layers of another phase change optical recording medium according to the present invention.

FIGS. 4A and 4B show the thermal response characteristics of the heat adjustment layer 3 and the recording layer 1, respectively, shown in FIG. 2. For comparison, the thermal response characteristics of a recording layer having no heat adjustment layer are shown in FIG. 5. FIG. 5 shows the thermal response characteristic when a layer with high thermal conductivity is formed adjacent to the recording layer and the recording layer is rapidly heated and cooled, and the thermal response characteristic when a layer with low thermal conductivity is formed adjacent to the recording layer and the recording layer is slowly heated and cooled. In FIGS. 4A to 5, the ordinate indicates a time, and the abscissa indicates a temperature. $t_p$ indicates the light pulse irradiation time or the time at which the medium traverses a laser beam spot.

The heat adjustment layer in FIG. 2 according to the present invention is basically so designed as to exhibit a slow heating-slow cooling thermal response characteristic by appropriately setting the film thickness and the surrounding film arrangement. As shown in FIG. 4A, the heat adjustment layer 3 is heated to $T_s$ or more to increase the thermal conductivity only in a time from $t_{s1}$ to $t_{s2}$. In this case the recording layer 1 shows the thermal response characteristics as in FIG. 4B. That is, a region O-S (FIG. 2) of the recording layer 1 shows a slow thermal response in a time from 0 to $t_{s1}$. However, this region O-S is rapidly heated and cooled in a time from $t_{s1}$ to $t_{s2}$ because the thermal conductivity of the heat adjustment layer 3 is increased. On the other hand, a region S-M (FIG. 2) of the recording layer 1 is slowly heated and cooled in a whole time from 0 to $t_{s2}$. As shown in FIG. 4B, therefore, by properly setting $T_m$ and $T_x$ of the recording layer, the time during which the recording layer passes through a temperature range ($T_m$ to $T_x$), within which the recording layer is crystallizable when the recording layer is cooled, can be set to a short time $\tau_{wos}$ in the region O-S and a long time $\tau_{wsm}$ in the region S-M. Accordingly, when these parameters are so set as to satisfy $\tau_{wos} < \tau_x < \tau_{wsm}$, only the region O-S of the recording layer 1 can be made amorphous to form fine recording marks, thereby realizing superresolution recording.

On the other hand, when the thermal conductivity of a layer formed adjacent to a recording layer does not change sharply with temperature such as in conventional media, the thermal response characteristic cannot be changed in accordance with the position in the recording layer unlike in the present invention.

The margin of the recording power when the above optical recording method is used will be described below. As can be understood from the recording principle of the phase change optical recording medium, the Γ characteristic of the recording layer corresponds to the way a recording mark changes when it enlarges. In the above optical recording method, the way a recording mark changes depends upon the way the region S of the heat adjustment layer changes with the recording power. Since the heat adjustment layer in FIG. 2 basically has a slow heating-slow cooling thermal response, the way the region S enlarges is slow to the recording power, so a practical recording power margin can be obtained.

Making the thermal response of the heat adjustment layer 3 slower than that of the region O-S of the recording layer 1 is advantageous in widening the margin of the recording power. That is, it is only necessary to make the speed at which S approaches O lower than the speed at which M approaches O in the cooling process. The following arrangements are practically possible to achieve this condition. For example, it is preferable to make the film thickness of the heat adjustment layer larger than that of the recording layer. Also, it is preferable that the thermal conductivity of a thin film formed on the side of the heat adjustment layer away from the recording layer be made smaller than the thermal conductivity of a thin film formed between the heat adjustment layer and the recording layer. Furthermore, the barrier layer is preferably given a heat insulating function.

A superresolution recording method preferably applicable to the phase change optical recording medium of the present invention having a heat adjustment layer made from a material whose thermal conductivity decreases with increasing temperature (i.e., increasing light intensity) will be described below. In principle, this second optical recording method forms fine recording marks by limiting the region where $T \geq T_m$ only to the central portion of the light irradiated portion.

FIG. 6 shows only the principal layers of the phase change optical recording medium having a heat adjustment layer whose thermal conductivity decreases with increasing light intensity. As shown in FIG. 6, a barrier layer 2 and a heat adjustment layer 4 whose thermal conductivity decreases in accordance with the light intensity are stacked on a phase change optical recording layer 1. Symbols shown in FIG. 6 have the same meanings as in FIG. 2. That is, O indicates the center of the laser beam spot, S indicates a position at which the temperature of the heat adjustment layer 4 has reached the transition point $T_s$ (in this case the melting point), and M indicates a position where the temperature of the recording layer 1 has reached the melting point $T_m$.

Figure 7:
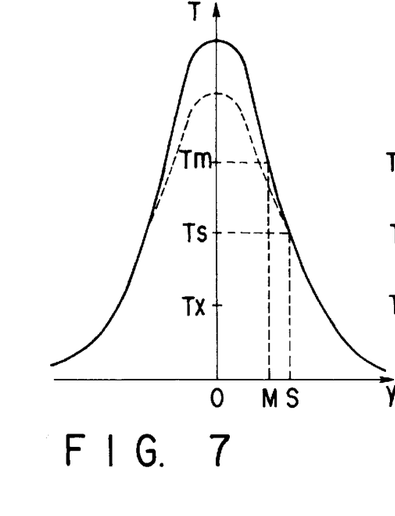
FIG. 7 is a graph showing the temperature distribution of the recording layer of the phase change optical recording medium in FIG. 6.

FIG. 7 shows the temperature distributions of the recording layer 1 in FIG. 6. As shown in FIG. 7, the transition point $T_s$ at which the thermal conductivity of the heat adjustment layer 4 largely decreases is set to be lower than the melting point $T_m$ of the recording layer 1. The broken curve in FIG. 7 shows the temperature distribution of the recording layer 1 when it is assumed that the thermal conductivity of the heat adjustment layer 4 does not change. The solid curve in FIG. 7 shows the temperature distribution of the recording layer 1 which is affected by changes in the thermal conductivity of the heat adjustment layer 4. When the temperature of the heat adjustment layer 4 exceeds $T_s$, its thermal conductivity decreases to lower the heat radiation properties, and this enhances temperature rise in the recording layer 1. Consequently, as shown in FIG. 7, the temperature distribution of the recording layer 1 in FIG. 6, which is indicated by the solid curve in FIG. 7, has a shape formed by superposing a small and steep Gaussian distribution on the broken-curve temperature distribution in a temperature region above $T_s$.

Figure 8:
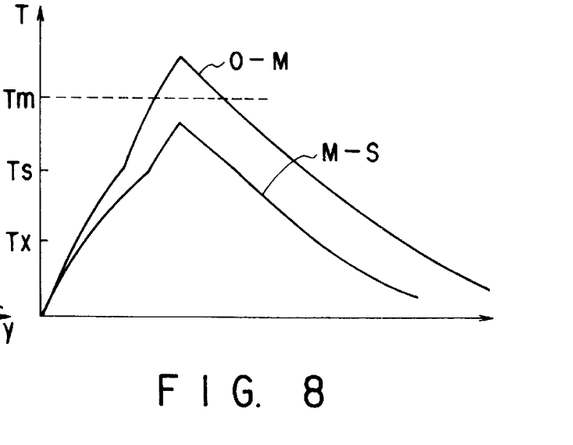
FIG. 8 is a graph showing the thermal response characteristics of the recording layer of the phase change optical recording medium in FIG. 6.

FIG. 8 is a graph showing the thermal response characteristics of the recording layer 1 in FIG. 6. As shown in FIG. 8, when $T_m$ is appropriately set, a region which satisfies the recording mark formation condition ($T \geq T_m$) can be formed near the full-width at half maximum of the small and steep Gaussian distribution in the upper portion of the solid curve in FIG. 7. As a result, a fine recording mark can be formed only in a region O-M in FIG. 6, and this realizes superresolution recording. In addition, the recording power margin can be made relatively wide. In this second optical recording method of the present invention, unlike in the first optical recording method, during the course of cooling it is unnecessary to differentiate the cooling rates of the recording layer and the heat adjustment layer or change the cooling rate in accordance with the position in the recording layer.

The heat adjustment layer according to the present invention is not restricted to the low-melting metal layer as described above but can take another form provided that the layer has the property of changing its thermal conductivity when irradiated with light. Examples of this heat adjustment layer are a layer formed by stacking a layer having a magnetoresistance effect and a layer which generates a magnetic field when irradiated with light, and a layer made from a material having photoconductivity at the laser wavelength used. In these heat adjustment layers, the thermal conductivity generally increases with increasing light intensity or temperature. Also, these heat adjustment layers are advantageous in increasing the number of repetitive recording times since they do not use melting of their materials.

Figure 9:
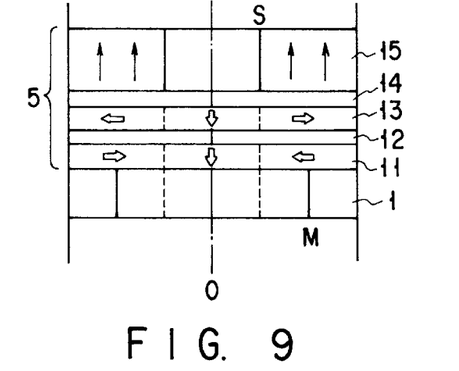
FIG. 9 is a view showing the principal layers of still another phase change optical recording medium according to the present invention.

FIG. 9 shows the principal layers of a phase change optical recording medium having a heat adjustment layer with a structure in which a layer having a magnetoresistance effect and a layer which generates a magnetic field when irradiated with light are stacked. Referring to FIG. 9, a unit of heat adjustment layer 5 having a stacked structure is formed on a phase change optical recording layer 1. This heat adjustment layer 5 is formed by sequentially stacking an FeCo lower soft magnetic layer 11, a Cu nonmagnetic layer 12, an FeCo upper soft magnetic layer 13, an SiN nonmagnetic layer 14, and a field supply layer 15 on the recording layer 1. In this structure, the lower soft magnetic layer 11, the nonmagnetic layer 12, and the upper soft magnetic layer 13 constitute a magnetoresistive element with a so-called spin valve structure. Since the spin valve element is composed of metals, the electrical and thermal resistances of the element have a proportional relationship which obeys a Wiedemann-Franz law. The field supply layer 15 is made of a magnetic thin film with perpendicular magnetization or longitudinal magnetization having a proper Curie temperature. This field supply layer 15 is initially oriented such that the magnetizations are in the same direction (in FIG. 9, upper direction). The nonmagnetic layer 14 has a function of disrupting the magnetic exchange coupling between the field supply layer 15 and the spin valve element (11, 12, and 13).

The principle of this phase change optical recording medium will be described below. Initially, the field supply layer 15 supplies no magnetic field to the outside. When no magnetic field is applied to the spin valve element, the lower and upper soft magnetic layers 11 and 13 magnetostatically couple with each other, and the magnetizations in these upper and lower layers become antiparallel, resulting in a high electrical resistance. Therefore, with no magnetic field applied, the thermal resistance of the spin valve element is high, i.e., its thermal conductivity is low. On the other hand, upon being heated to the Curie point or higher by irradiation of a laser beam, the field supply layer 15 generates a magnetic field to the outside. Referring to FIG. 9, in the central portion of a region in the upward initial magnetized state, whose radius is indicated by the position S which is nearly at the Curie point, a downward magnetic field is generated. The magnetizations in the soft magnetic films 11 and 13 constituting the spin valve element are arranged in the direction of this magnetic field. As a consequence, the spin valve element decreases the electrical resistance and the thermal resistance, i.e., increases the thermal conductivity. Accordingly, superresolution recording can be accomplished by the same principle as the first optical recording method explained with reference to FIGS. 1 to 4B.

Note that since the Curie point of the field supply layer 15 can be controlled by the composition, the relative position between S (a position at which the field supply layer 15 is heated to the Curie point) and M (a position at which the recording layer is heated to the melting point) can also be changed. Therefore, some appropriate hard magnetic film is formed in addition to the spin valve element such that the magnetizations in the spin valve soft magnetic films are arranged in the same direction when there is no magnetic field and only the magnetizations in one of the soft magnetic films are reversed upon application of a magnetic field. With this structure, superresolution recording can be achieved by the same principle as the second optical recording method explained with reference to FIGS. 6 to 8.

Instead of the spin valve element, it is also possible to use an anisotropic magnetoresistive element or an artificial lattice magnetoresistive element.

Figure 10:
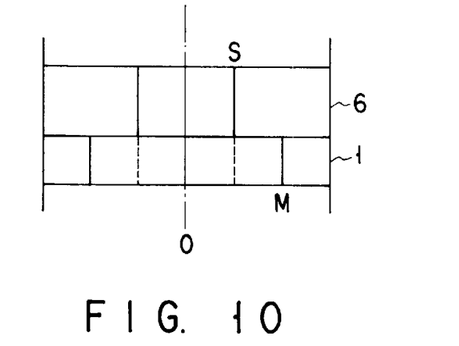
FIG. 10 is a view showing the principal layers of still another phase change optical recording medium according to the present invention.

FIG. 10 shows the principal layers of a phase change optical recording medium having a heat adjustment layer made from a photoconductive material. As shown in FIG. 10, a heat adjustment layer 6 made from a material having photoconductivity with respect to the laser beam used is stacked on a recording layer 1. The photoconductivity results from carriers excited by photons, and these excited carriers contribute to thermal conduction as well as electrical conduction. Since the number of carriers is proportional to the laser power, the thermal conductivity can be raised as the position becomes closer to the center of a spot. Accordingly, superresolution recording can be realized by the same principle as the first optical recording method explained with reference to FIGS. 1 to 4B.

In the phase change optical recording medium of the present invention, various transparent materials can be used as the substrate material. Also, various modifications are possible for the arrangement of layers except the phase change optical recording layer and the heat adjustment layer. For example, protective layers (optical interference layers) are generally formed on the two sides of the stacked structure including the recording layer and the heat adjustment layer. When recording marks much smaller than a laser beam spot are recorded at a narrow mark pitch or at a high density in accordance with the present invention and reproduced by a normal reproduction method, interference between marks and crosstalk increase to lower the readout resolution. Therefore, it is preferable to combine superresolution recording and a superresolution readout capable of obtaining high resolution. To perform superresolution readout, a masking layer (superresolution readout layer) made from a material whose light transmittance changes in accordance with increasing intensity of the reproducing laser beam (i.e., increasing temperature) is preferably formed on the light source side of the recording layer. This material can be properly selected from organic materials and phase change inorganic materials with stoichiometric compositions. Note that the material of the superresolution readout layer is preferably a material whose light transmittance increases with increasing temperature. When an organic material is used, the superresolution readout layer can be formed by a single layer. When a phase change inorganic material is used for the superresolution readout layer, it is preferable to additionally form a semitransparent metal layer between the substrate and the lower protective layer.

EXAMPLES

Examples of the present invention will be described below.

Example 1

Figure 11:
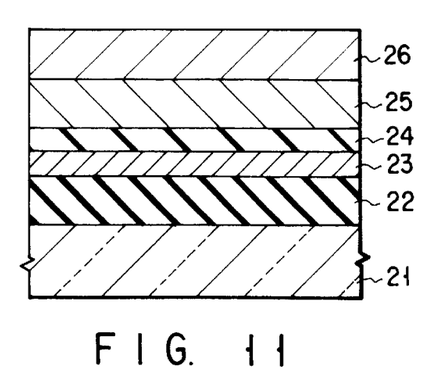
FIG. 11 is a sectional view of the phase change optical recording medium in Example 1-1.

In this example, a phase change optical disk shown in FIG. 11 is manufactured. This phase change optical disk has a structure in which a 200-nm thick SiN lower protective layer 22, a 20-nm thick GeSbTe recording layer 23, a 10-nm thick SiN barrier layer 24, a heat adjustment layer 25, and a 100-nm thick ZnS—SiO$_2$ upper protective layer 26 are stacked by sputtering on a grooved polycarbonate substrate 21.

The heat adjustment layer 25 is made from 50-nm thick TeZn (Example 1-1) or 30-nm thick SnY (Example 1-2). TeZn sharply increases its thermal conductivity when melted, and SnY sharply decreases its thermal conductivity when melted.

For comparison, a conventional phase change optical disk (Comparative Example 1) in which the barrier layer 24 and the heat adjustment layer 25 in FIG. 11 are not formed is manufactured.

After being initially crystallized, each optical disk is placed in an optical disk drive whose light source is a semiconductor laser with a wavelength of 680 nm, and rotated at a linear velocity of 10 m/s to form recording marks at a recording frequency of 5 MHz.

Figure 12A:
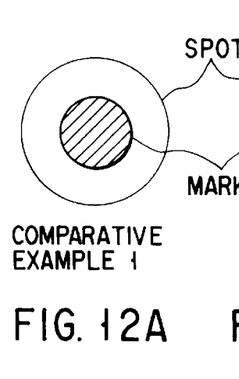
FIG. 12A is a schematic view showing the relationship between the sizes of the laser beam spot and the recording mark in the phase change optical recording medium of Comparative Example 1.
Figure 12B:
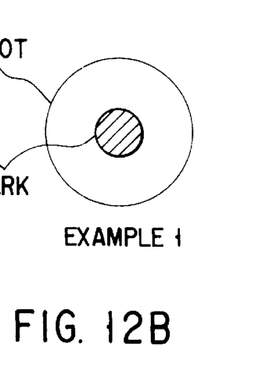
FIG. 12B is a schematic view showing the relationship between the sizes of the laser beam spot and the recording mark in the phase change optical recording medium of Example 1-1.

FIGS. 12A and 12B show the relationships between the sizes of the laser spot and the recording mark in the phase change optical recording media of Comparative Example 1 and Example 1, respectively. As shown in FIG. 12A, the size of the recording mark nearly equals the full-width at half maximum of the laser beam spot in the conventional medium of Comparative Example 1. On the other hand, as shown in FIG. 12B, the size of the recording mark is about ⅔ to ½ of the size of the laser beam spot in the phase change optical recording medium of Example 1.

Figures 13, 14, 15, 16:
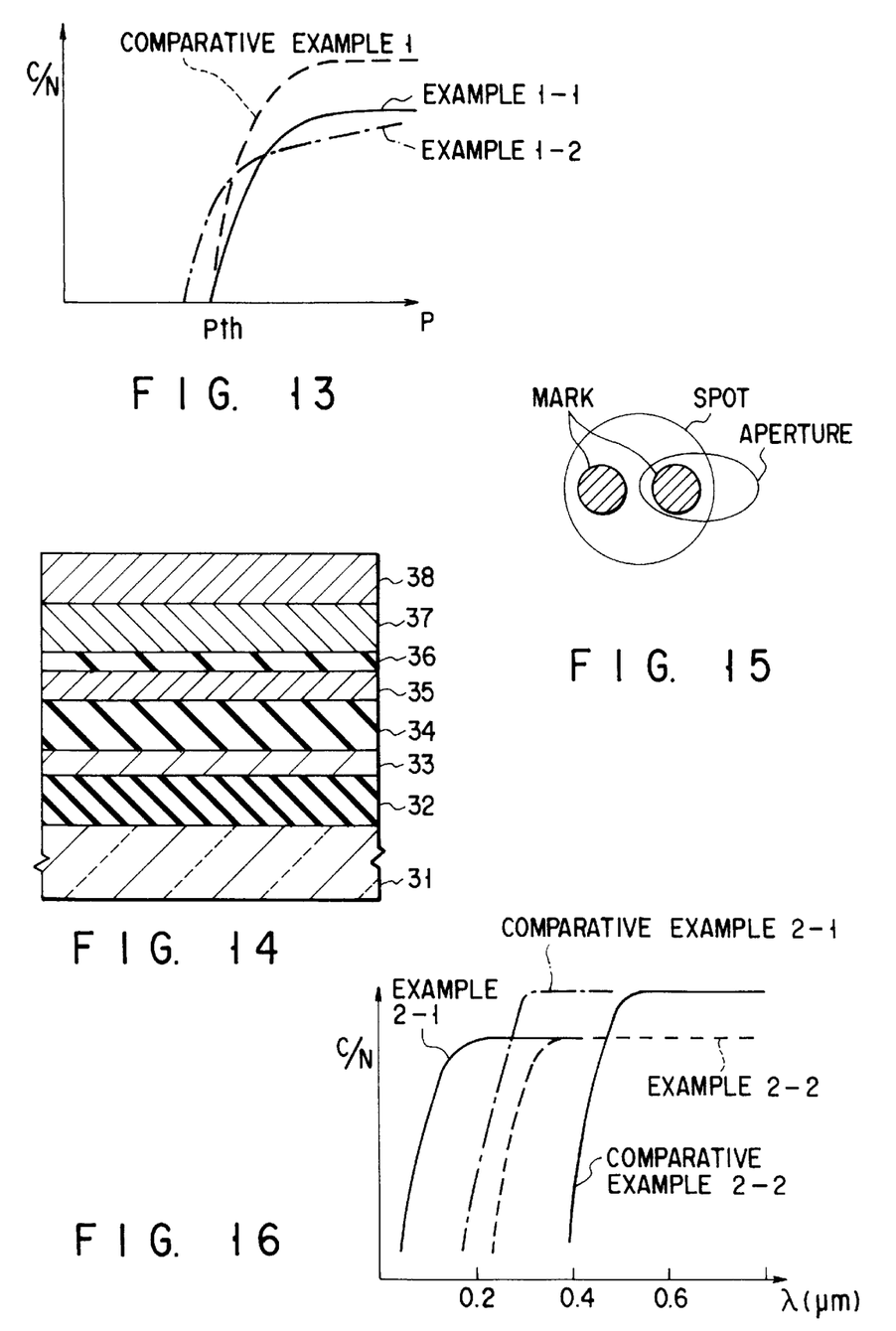
FIG. 13 is a graph showing the relationships between the recording power (P) and the C/N ratio of the readout signal in the phase change optical recording media of Examples 1-1 and 1-2 and Comparative Example 1.
FIG. 14 is a sectional view of the phase change optical recording medium in Example 2-1.
FIG. 15 is a view showing the positional relationship between the laser beam spot, the recording marks, and the readout aperture during readout in the phase change optical recording medium of Example 2-1.
FIG. 16 is a graph showing the relationships between the recording mark pitch (λ) and the C/N ratio of the readout signal in phase change optical recording media of Examples 2-1 and 2-2 and Comparative Examples 2-1 and 2-2.

FIG. 13 shows the relationships between the recording power (P) and the C/N ratio of the readout signal. Any of these optical disks shows a good Γ characteristic and has a stable power margin. The saturation values of the C/N ratio of the optical disks in Examples 1-1 and 1-2 are smaller than that of the optical disk in Comparative Example 1. This is so because the sizes of the recording marks in the optical disks of Examples 1-1 and 1-2 are smaller. In the optical disk of Example 1-2, the C/N ratio gradually increases with an increasing recording power even in the saturation region. However, this change is slow and shows practically satisfactory stability against power fluctuations.

Example 2

In this example, a phase change optical disk shown in FIG. 14 is manufactured. This phase change optical disk (Example 2-1) has a structure in which a 100-nm thick $ZnS-SiO_2$ lower protective layer 32, a 50-nm thick superresolution readout layer (masking layer) 33 made from an organic thermochromic material, a 50-nm thick SiN protective interlayer 34, a 20-nm thick GeSbTe recording layer 35, a 10-nm thick SiN barrier layer 36, a 50-nm thick TeZn heat adjustment layer 37, and a 100-nm thick $ZnS-SiO_2$ upper protective layer 38 are stacked by sputtering on a grooved polycarbonate substrate 31. The organic thermochromic material forming the superresolution readout layer 33 has the property of increasing its transmittance with increasing temperatures.

FIG. 15 shows the positional relationship between the laser beam spot, the recording mark, and the readout aperture during reproduction in this phase change optical disk. In the optical disk of Example 2-1, recording marks much smaller than the spot size can be recorded at narrow intervals by superresolution recording. These recording marks cannot be reproduced by ordinary readout methods because two marks are arranged in one readout spot. On the other hand, superresolution readout forms a readout aperture only in a high temperature region in the rear end portion of the spot and masks the other region. Consequently, it is possible to reproduce only a recording mark present in a region where the readout spot and the aperture formed in the masking layer overlap each other. Note that an aperture is also formed in the masking layer during recording. However, this aperture is large because the recording power is sufficiently high, so it is possible to assume that no aperture exists in a recording operation.

When only superresolution readout is performed by conventional techniques, it is possible to record marks at narrow mark intervals and reproduce the marks with high resolution. In the conventional techniques, however, the size of a recording mark itself is defined by the laser wavelength, and this restricts an improvement of the recording density. By contrast, in the optical disk of this example, it is in principle possible to decrease the size of the recording mark with no limitations by the laser wavelength. In the optical disk of this example, the readout signal intensity lowers with a reduction of the size of the recording mark. However, this influence is relatively small. In addition, in the optical disk of this example the size of the readout aperture can be designed in accordance with the size of the recording mark. This makes high-density recording/readout possible.

Subsequently, a phase change optical disk (superresolution recording and normal readout, Example 2-2) in which the lower protective layer 32 and the superresolution readout layer 33 in FIG. 14 are not formed is manufactured.

For comparison, a phase change optical disk (normal recording and superresolution readout, Comparative Example 2-1) is manufactured in which a 100-nm Al reflection layer is formed on the upper protective layer 38 without forming the barrier layer 36 and the heat adjustment layer 37 in FIG. 14.

Similarly, another phase change optical disk (normal recording and normal readout, Comparative Example 2-2) is manufactured for comparison in which a 100-nm thick Al reflection layer is formed on the upper protective layer 38 without forming the lower protective layer 32, the superresolution readout layer 33, the barrier layer 36, and the heat adjustment layer 37 in FIG. 14.

After being initially crystallized, each of the above media is placed in an optical disk drive whose light source is a semiconductor laser with a wavelength of 680 nm, and rotated at a linear velocity of 10 m/s to form recording marks while the recording frequency is changed. The change in the recording frequency corresponds to changes in the recording mark length and the interval ($\lambda$).

FIG. 16 shows the relationships between the recording mark interval ($\lambda$) and the C/N ratio of the readout signal. In the medium of Comparative Example 2-2, when the mark interval becomes smaller than the full-width at half maximum of the laser beam spot, the reproduction C/N ratio abruptly lowers due to the influence of interference between marks. By contrast, in the medium of Example 2-2, the mark interval at which the influence of interference between marks appears is narrow because the recording mark size is reduced, although no superresolution readout is performed. In the medium of Comparative Example 2-1, high-density recording/readout performance equivalent to or slightly better than that of Example 2-2 can be obtained by optimization of the readout aperture size. Further, in the medium of Example 2-1 using both superresolution recording and superresolution readout, recording and reproduction can be performed while the mark pitch is decreased to about one-half of those in Example 2-2 and Comparative Example 2-1.

The present invention is also effective in decreasing the track pitch as well as the recording mark pitch on a track. According to calculations, therefore, recording and reproduction can be performed with a minimum recording mark length of 0.15 $\mu$m and a track pitch of 0.3 $\mu$m, for example, even when a laser with a wavelength of 680 nm and an objective lens with a numerical aperture of 0.6 are combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A phase change optical recording medium comprising:
    a phase change optical recording layer which has a melting point ranging from 400 to 800° C. and transits between two states of a crystalline state and an amorphous state when irradiated with light; and a heat adjustment layer which is formed adjacent to said phase change optical recording layer and made from a material whose thermal conductivity increases with increasing light intensity.

2. A phase change optical recording medium comprising:

a phase change optical recording layer, having a melting point ranging from 400 to 800° C., transits between two states of a crystalline state and an amorphous state when irradiated with light; and a heat adjustment layer, made from a material whose thermal conductivity increases with increasing light intensity, forms a structure in which a first layer having a magnetoresistance effect and a second layer which generates a magnetic field upon being irradiated with light are stacked.

3. A phase change optical recording layer, having a melting point ranging from 400 to 800° C., transits between two states of a crystalline state and an amorphous state when irradiated with light; and a heat adjustment layer which is made from a material having photoconductivity at an operating laser wavelength.

4. A phase change optical recording medium comprising:

a phase change optical recording layer, having a melting point ranking from 400 to 800° C., transits between two states of a crystalline state and an amorphous state when irradiated with light; and a heat adjustment layer formed adjacent to said phase change optical recording layer and made from a material whose thermal conductivity decreases with increasing light intensity and which is selected from the group consisting of Zn, Pb, Sn, alloys thereof, and SnY.

5. The medium according to claim 1, wherein a transition point at which the thermal conductivity of said heat adjustment layer increases is higher than a melting point of said phase change optical recording layer.

6. The medium according to claim 1, wherein the material whose thermal conductivity increases with increasing light intensity is selected from the group consisting of Bi, Sb, Te, alloys thereof, and TeZn.

7. The medium according to claim 1, wherein a material forming said phase change optical recording layer is selected from the group consisting of GeSbTe, SnSeTe, InSeTlCo, InSeTe, AgInSbTe, and InSbTe.

8. The medium according to claim 1, wherein said heat adjustment layer is in direct contact with said phase change optical recording layer.

9. The medium according to claim 1, wherein a barrier layer is formed between said heat adjustment layer and said phase change optical recording layer.

10. The medium according to claim 1, further comprising a masking layer whose light transmittance increases with increasing intensity of a reproducing laser beam on a light source side of said phase change optical recording layer.

11. The medium according to claim 1, comprising a structure in which a lower protective layer, a phase change optical recording layer, a barrier layer, a heat adjustment layer, and an upper protective layer are stacked on a transparent substrate.

12. The medium according to claim 1, comprising a structure in which a lower protective layer, a masking layer, a protective interlayer, a phase change optical recording layer, a barrier layer, a heat adjustment layer, and an upper protective layer are stacked on a transparent substrate.

13. The medium according to claim 2, wherein:

said first layer having the magnetoresistance effect is made of a magnetoresistance element with a spin valve structure in which a lower soft magnetic layer are stacked, said second layer which generates the magnetic field upon being irradiated with light is made of a magnetic thin film with perpendicular magnetization, and a nonmagnetic layer is formed between said first layer and said second layer.

14. The medium according to claim 4, wherein a material forming said phase change optical recording layer is selected from the group consisting of GeSbTe, SnSeTe, InSeTlCo, InSeTe, AgInSbTe, and InSbTe.

15. The medium according to claim 4, wherein said heat adjustment layer is in direct contact with said phase change optical recording layer.

16. The medium according to claim 4, wherein a barrier layer is formed between said heat adjustment layer and said phase change optical recording layer.

17. The medium according to claim 4, further comprising a masking layer whose light transmittance increases with increasing intensity of a reproducing laser beam on a light source side of said phase change optical recording layer.

18. The medium according to claim 4, comprising a structure in which a lower protective layer, a phase change optical recording layer, a barrier layer, a heat adjustment layer, and an upper protective layer are stacked on a transparent substrate.

19. The medium according to claim 4, comprising a structure in which a lower protective layer, a masking layer, a protective interlayer, a phase change optical recording layer, a barrier layer, a heat adjustment layer, and an upper protective layer are stacked on a transparent substrate.

* * * * *